United States Patent
Mi et al.

(10) Patent No.: US 8,953,351 B2
(45) Date of Patent: Feb. 10, 2015

(54) POWER CONVERSION APPARATUS FOR ELECTRONIC APPARATUS

(71) Applicants: Tzu-Chiang Mi, Taipei (TW); Yi-Hsun Lin, Taipei (TW); Siou-Yi Lin, Taipei (TW)

(72) Inventors: Tzu-Chiang Mi, Taipei (TW); Yi-Hsun Lin, Taipei (TW); Siou-Yi Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 14/133,664

(22) Filed: Dec. 19, 2013

(65) Prior Publication Data

US 2014/0177296 A1    Jun. 26, 2014

Related U.S. Application Data

(60) Provisional application No. 61/740,431, filed on Dec. 20, 2012.

(51) Int. Cl.
*H02M 7/217* (2006.01)
*H02M 3/335* (2006.01)
*H02M 1/36* (2007.01)

(52) U.S. Cl.
CPC ............ *H02M 3/33553* (2013.01); *H02M 1/36* (2013.01)
USPC ........................................................ 363/127

(58) Field of Classification Search
USPC ................ 363/49, 84, 89, 125–127, 146–147
See application file for complete search history.

(56) References Cited

U.S. PATENT DOCUMENTS

| | | | | | |
|---|---|---|---|---|---|
| 4,118,712 | A | * | 10/1978 | Kawasaki | 396/287 |
| 5,003,192 | A | * | 3/1991 | Beigel | 307/140 |
| 5,033,012 | A | * | 7/1991 | Wohld | 702/41 |
| 5,103,390 | A | * | 4/1992 | Liu | 363/132 |
| 5,201,066 | A | * | 4/1993 | Kim | 455/411 |
| 5,489,891 | A | * | 2/1996 | Diong et al. | 340/567 |
| 5,617,013 | A | * | 4/1997 | Cozzi | 323/222 |
| 5,731,681 | A | * | 3/1998 | Inaniwa et al. | 318/729 |
| 6,144,187 | A | * | 11/2000 | Bryson | 320/137 |
| 6,362,980 | B1 | * | 3/2002 | Ohashi et al. | 363/21.01 |
| 6,480,043 | B2 | * | 11/2002 | Hall et al. | 327/108 |
| 6,844,705 | B2 | * | 1/2005 | Lai et al. | 320/137 |
| 7,990,106 | B2 | * | 8/2011 | Hussain et al. | 320/128 |
| 8,390,248 | B2 | * | 3/2013 | Oda et al. | 320/107 |
| 2003/0034209 | A1 | * | 2/2003 | Tang et al. | 187/247 |
| 2004/0105285 | A1 | * | 6/2004 | Tanaka et al. | 363/73 |
| 2005/0168189 | A1 | * | 8/2005 | Schweigert | 320/107 |
| 2008/0197825 | A1 | * | 8/2008 | Siri | 323/272 |
| 2008/0259659 | A1 | * | 10/2008 | Choi et al. | 363/50 |
| 2008/0278006 | A1 | * | 11/2008 | Gottlieb et al. | 307/66 |
| 2008/0285321 | A1 | * | 11/2008 | Fukumoto | 363/132 |
| 2009/0021970 | A1 | * | 1/2009 | Fukumoto | 363/131 |

(Continued)

*Primary Examiner* — Timothy J Dole
*Assistant Examiner* — Yusef Ahmed
(74) *Attorney, Agent, or Firm* — Jianq Chyun IP Office (57) ABSTRACT

A power conversion apparatus is provided. The power conversion apparatus includes an AC to DC adapter, an input port, a power conversion control unit, and a restart circuit. The AC to DC adapter converts an AC input voltage into a DC output voltage according to an external signal of an electronic apparatus and provides the DC output voltage to the electronic apparatus. The input port receives the AC input voltage through an AC input terminal. If the power conversion apparatus does not output the DC output voltage to the electronic apparatus, the power conversion control unit turns off the power conversion apparatus. If the restart circuit detects that an insertion action occurs on the input port, the restart circuit transmits a trigger signal to turn on the power conversion control unit in an off mode.

7 Claims, 5 Drawing Sheets

(56) References Cited

U.S. PATENT DOCUMENTS

| | | | |
|---|---|---|---|
| 2009/0237969 A1* | 9/2009 | Fukumoto et al. | 363/97 |
| 2009/0322287 A1* | 12/2009 | Ozeki et al. | 320/145 |
| 2010/0164440 A1* | 7/2010 | Ikeda | 320/162 |
| 2011/0134664 A1* | 6/2011 | Berghegger | 363/49 |
| 2011/0179292 A1* | 7/2011 | Clegg et al. | 713/300 |
| 2011/0215770 A1* | 9/2011 | Belz | 320/160 |
| 2012/0080944 A1* | 4/2012 | Recker et al. | 307/25 |
| 2012/0106208 A1* | 5/2012 | Sugawara | 363/21.13 |
| 2012/0139342 A1* | 6/2012 | Bailey et al. | 307/31 |
| 2012/0235630 A1* | 9/2012 | Qiu et al. | 320/107 |
| 2012/0256597 A1* | 10/2012 | Miyamoto | 320/137 |
| 2012/0286671 A1* | 11/2012 | Shteynberg et al. | 315/151 |
| 2013/0088206 A1* | 4/2013 | Tsou et al. | 323/234 |
| 2013/0113416 A1* | 5/2013 | Ishibashi | 320/107 |
| 2014/0016373 A1* | 1/2014 | Zhang et al. | 363/21.15 |
| 2014/0167728 A1* | 6/2014 | Liu | 323/318 |

* cited by examiner

POWER CONVERSION APPARATUS FOR ELECTRONIC APPARATUS

CROSS-REFERENCE TO RELATED APPLICATION

This application claims the priority benefits of U.S. provisional application Ser. No. 61/740,431, filed on Dec. 20, 2012. The entirety of the above-mentioned patent application is hereby incorporated by reference herein and made a part of this specification.

BACKGROUND OF THE INVENTION

1. Field of the Invention

The invention relates to a power control technique and particularly to a power conversion apparatus capable of performing a power saving function.

2. Description of Related Art

At present, due to the requirement for the reduced weight of consumers' electronic apparatuses (e.g., desktop computers, notebooks, mobile phones, digital cameras, tablet PCs, etc.), power may be supplied by batteries within the electronic apparatuses or by external power adapters. That is, the electronic apparatuses require the power conversion apparatuses (e.g., alternating-current (AC) to direct-current (DC) adapters) to supply power or to charge the internal batteries.

As to the existing power supply system, said power conversion apparatus is a passive apparatus. Namely, when an input terminal of the power conversion apparatus is connected to an AC power supply, the power conversion apparatus passively provides the stable DC power to the electronic apparatus connected to the power conversion apparatus. However, once the power conversion apparatus is connected to the AC power supply, the power conversion apparatus may continue providing the DC power even though the power conversion apparatus is not connected to any electronic apparatus or the electronic apparatus connected to the power conversion apparatus is in an off mode. Accordingly, the existing power conversion apparatus is unable to adjust the output power according to the state of the electronic apparatus connected to the power conversion apparatus, which leads to the significant amount of unnecessary power consumption.

SUMMARY OF THE INVENTION

The invention is directed to a power conversion apparatus which is able to determine a state of an electronic apparatus by means of an external signal from the electronic apparatus. According to the state of the electronic apparatus, the power conversion apparatus may be dynamically turned on or turned off, such that the power consumption of the power conversion apparatus may be effectively managed and economized.

In an embodiment of the invention, a power conversion apparatus is provided. The power conversion apparatus includes an AC to DC adapter, an input port, a power conversion control unit, and a restart circuit. The AC to DC adapter is coupled to an electronic apparatus, and the AC to DC adapter converts an AC input voltage into a DC output voltage according to an external signal of the electronic apparatus and provides the DC output voltage to the electronic apparatus. The input port receives the AC input voltage through an AC input terminal. The power conversion control unit is coupled to the AC to DC adapter. If the power conversion apparatus does not output the DC output voltage to the electronic apparatus, the power conversion apparatus is turned off. The restart circuit is coupled to the input port and the power conversion control unit. If the restart circuit detects that an insertion action occurs on the input port, the restart circuit transmits a trigger signal to turn on the power conversion control unit in an off mode.

According to an embodiment of the invention, the electronic apparatus includes a controller that is configured for outputting the external signal corresponding to a state of the electronic apparatus.

According to an embodiment of the invention, when the electronic apparatus is turned on, the power conversion control unit turns on the power conversion apparatus according to the external signal.

According to an embodiment of the invention, conditions that the power conversion apparatus does not output the DC output voltage to the electronic apparatus include a condition that the electronic apparatus is turned off or a condition that power conversion control unit does not receive the external signal.

According to an embodiment of the invention, the power conversion control unit includes a logic circuit and a counter. The logic circuit outputs a start signal to the AC to DC adapter according to the external signal. The counter is coupled to the restart circuit and the logic circuit and configured to count while the power conversion control unit starts up. The AC to DC convertor supplies the DC output voltage to a power output terminal of the power conversion apparatus within a predetermined period. After the predetermined period, if the electronic apparatus stays turned off, or the power conversion control unit does not receive the external signal, the power conversion control unit controls the AC to DC adapter to stop supplying the DC output voltage and turn off the power conversion apparatus.

According to an embodiment of the invention, the power conversion control unit further includes a light coupling circuit. The light coupling circuit is coupled to the logic circuit and configured for receiving the external signal and transmitting the external signal to the logic circuit to detect the state of the electronic apparatus.

In view of the above, an external signal is transmitted between the power conversion apparatus described in an embodiment of the invention and an electronic apparatus, and the external signal serves to indicate the state of the electronic apparatus. According to the external signal, the power conversion control unit of the power conversion apparatus is able to determine the state of the electronic apparatus; in addition, the power conversion apparatus may be dynamically turned on or turned off to comply with its requirement for power consumption. Thereby, unnecessary power consumption may be prevented, and the use of power may be economized.

In order to make the aforementioned and other features and advantages of the invention comprehensible, embodiments accompanied with figures are described in detail below.

DETAILED DESCRIPTION OF DISCLOSED EMBODIMENTS

In order to prevent the power supply system from consuming unnecessary power, an embodiment of the invention provides a power conversion apparatus. An external signal is transmitted between the power conversion apparatus and an electronic apparatus; thereby, the power conversion apparatus is able to learn the power requirement of the electronic apparatus connected to the power conversion apparatus according to the external signal, and the power conversion apparatus may accordingly be dynamically turned on or turned off. As a result, the power conversion apparatus may supply power in a manner complying with the power requirement of the electronic apparatus without consuming unnecessary power.

It is to be understood that the foregoing and other detailed descriptions, features, and advantages provided in the embodiments of the invention are intended to be described more comprehensively hereinafter with reference to the drawings. In addition, whenever possible, identical or similar reference numbers stand for identical or similar elements in the drawings and the embodiments.

Figure 1:
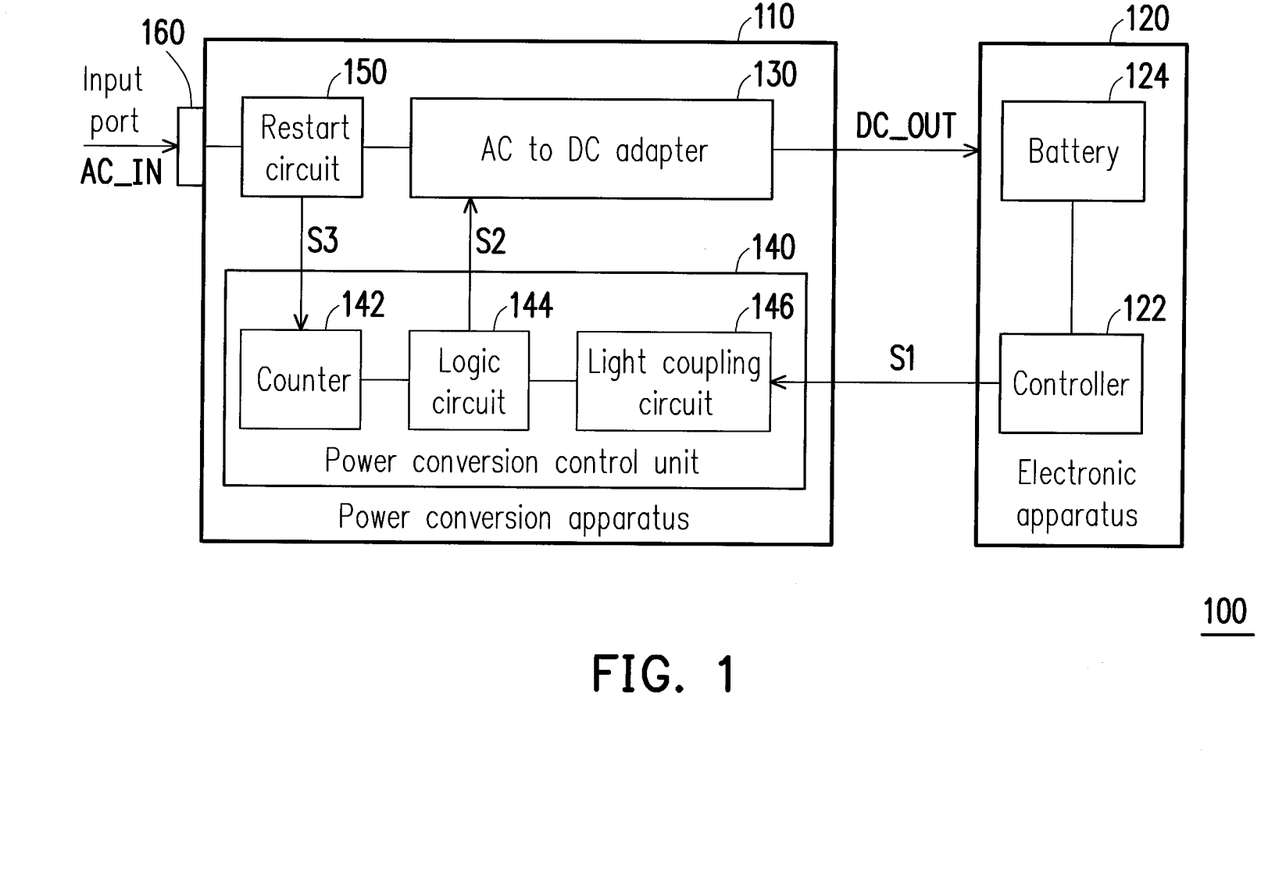
FIG. 1 is a block diagram illustrating a power supply system according to an embodiment of the invention.

FIG. 1 is a block diagram illustrating a power supply system 100 according to an embodiment of the invention. With reference to FIG. 1, the power supply system 100 includes a power conversion apparatus 110 and an electronic apparatus 120. In FIG. 1, the power conversion apparatus 110 includes an AC to DC adapter 130, a power conversion control unit 140, a restart circuit 150, and an input port 160. The power conversion control unit 140 includes a counter 142, a logic circuit 144, and a light coupling circuit 146. The logic circuit 144 is respectively coupled to the counter 142 and the light coupling circuit 146. The electronic apparatus 120 includes a controller 122 and a battery 124 coupled to the controller 122. Here, the controller 122 may be, for instance, an embedded controller (EC) or a keyboard controller (KBC). The power conversion control unit 140 is coupled to the AC to DC adapter 130 and the electronic apparatus 120. The power conversion control unit 140 determines the state of the electronic apparatus 120 according to an external signal S1 from the electronic apparatus 120 and transmits a start signal S2 to the AC to DC adapter 130 to control the AC to DC adapter 130, so as to turn on or turn off the power conversion apparatus 110. The AC to DC adapter 130 is coupled to the electronic apparatus 120 and configured to convert an AC input voltage AC_IN into a DC output voltage DC_OUT according to the external signal S1 and provide the DC output voltage DC_OUT to the electronic apparatus 120.

Figure 2:
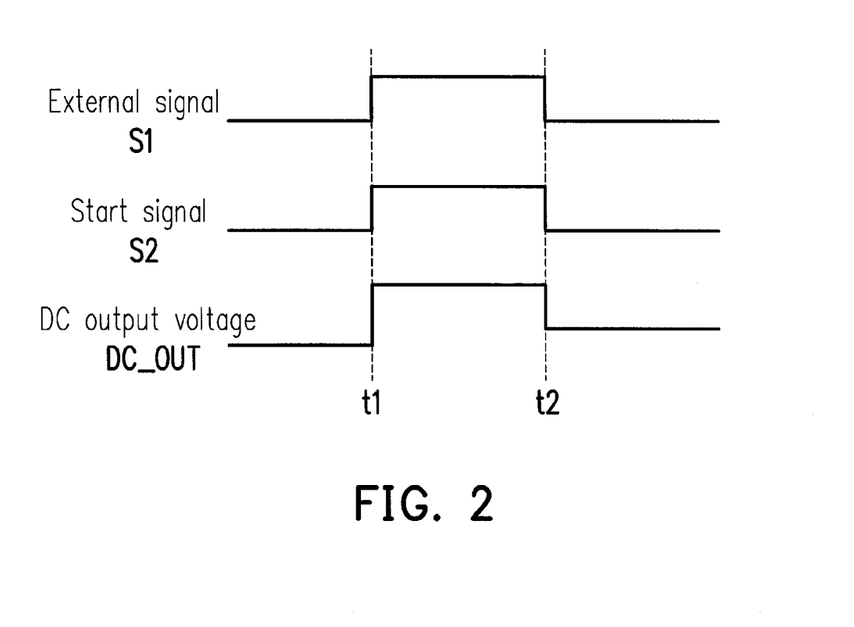
FIG. 2 is a timing diagram illustrating signals of a power supply system according to an embodiment of the invention.

FIG. 2 is a timing diagram illustrating signals of a power supply system according to an embodiment of the invention. Specifically, FIG. 2 shows the operations of the external signal S1, the start signal S2, and the DC output voltage DC_OUT. The operations of components in FIG. 1 will be described below with reference to FIG. 2.

With reference to FIG. 1 and FIG. 2, in the present embodiment, if the power conversion apparatus 110 does not output the DC output voltage DC_OUT to the electronic apparatus 120, and the power conversion apparatus 110 does not receive the external signal S1 (because the electronic apparatus 120 is turned off, because the power conversion control unit 140 is not connected to the power conversion apparatus 110, or because of any other possible reasons), the power conversion control unit 140 may timely learn the state of the electronic apparatus 120 according to the external signal S1; according to the start signal S2 generated by the power conversion control unit 140, the AC to DC adapter 130 stops providing the DC output voltage DC_OUT, so as to turn off the power conversion apparatus 110.

In particular, at the timing t2 shown in FIG. 2, the electronic apparatus 120 is turned off, the controller 122 stops enabling the external signal S1 (actually at a low level) and transmits the external signal S1 (that is no longer enabled) to the power conversion control unit 140, and the logic circuit 144 of the power conversion control unit 140 may detect the voltage level of the external signal S1 by means of the light coupling circuit 146, so as to learn whether the electronic apparatus 120 is turned off or is not connected. Thereby, at the timing t2, the logic circuit 144 also stops enabling the start signal S2 (actually at a high level), such that the AC to DC adapter 130 stops providing the DC output voltage DC_OUT, and that the power conversion apparatus 110 is turned off.

By contrast, as shown in FIG. 1 and FIG. 2, when the electronic apparatus 120 is turned on, the power conversion control unit 140 may also timely learn the state of the electronic apparatus 120 according to the external signal S1; according to the start signal S2, the AC to DC adapter 130 provides the DC output voltage DC_OUT, so as to turn on the power conversion apparatus 110.

In particular, at the timing t1 shown in FIG. 2, the electronic apparatus 120 is turned on, the controller 122 enables the external signal S1 (actually at a high level) and transmits the enabled external signal S1 to the power conversion control unit 140, and the logic circuit 144 of the power conversion control unit 140 may detect the voltage level of the external signal S1 by means of the light coupling circuit 146, so as to learn that the electronic apparatus 120 is turned on. Thereby, at the timing t1, the logic circuit 144 also enables the start signal S2 (actually at a low level), such that the AC to DC adapter 130 provides the DC output voltage DC_OUT, and that the power conversion apparatus 110 is turned on.

Figure 3:
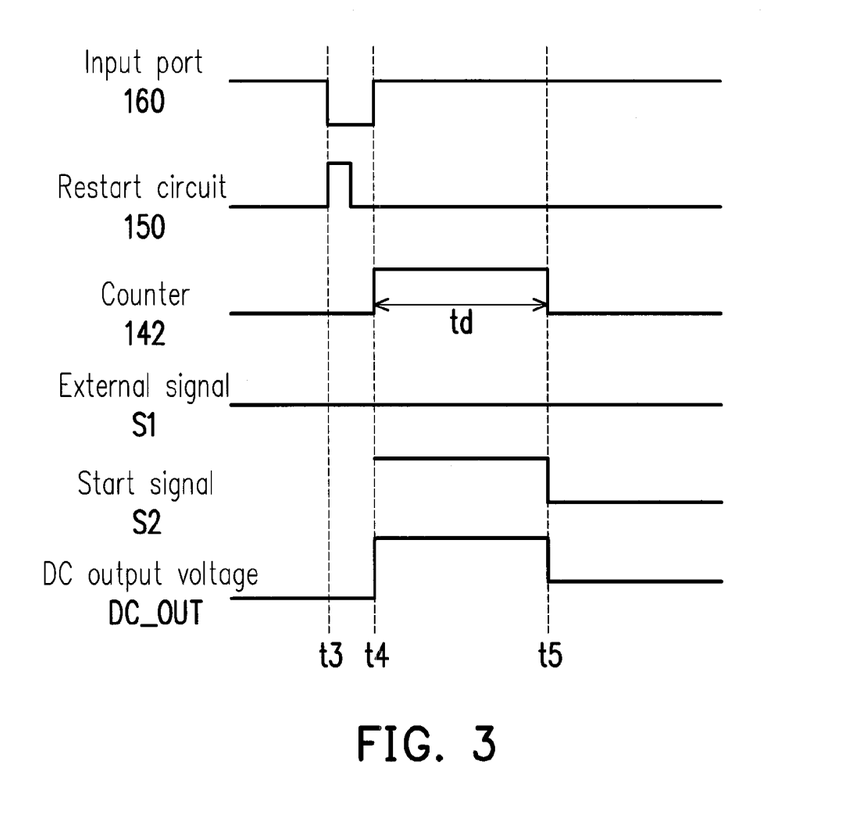
FIG. 3 is a timing diagram illustrating signals of a power supply system according to an embodiment of the invention.
Figure 4:
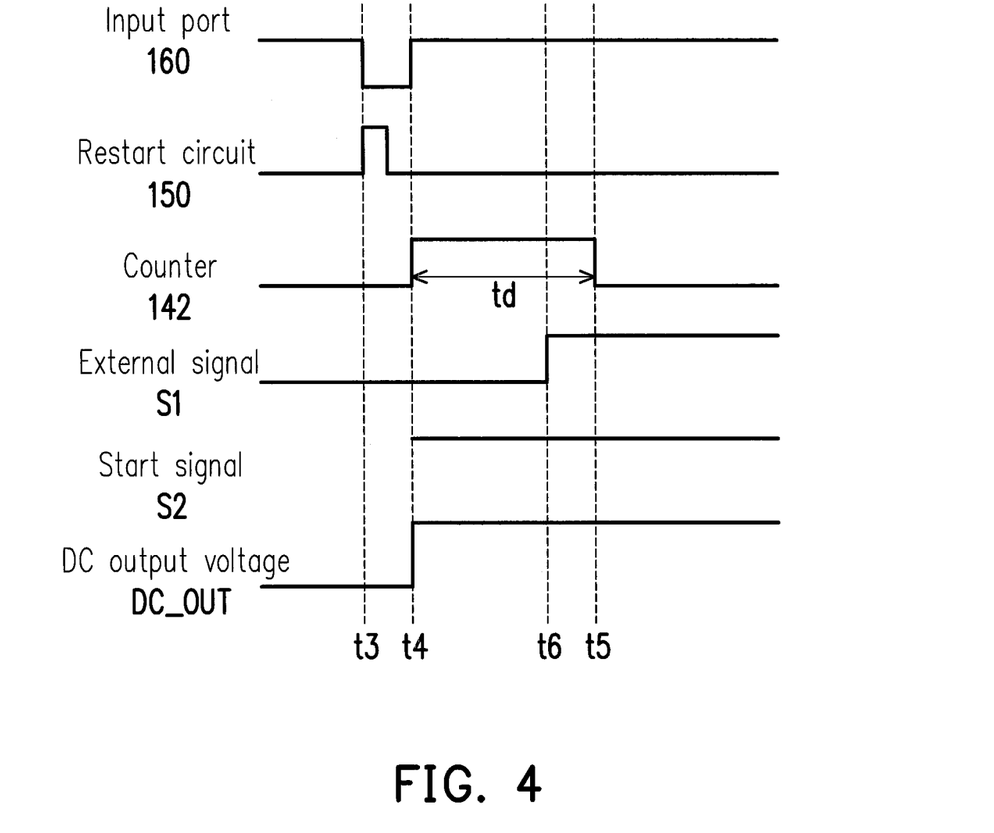
FIG. 4 is a timing diagram illustrating signals of a power supply system according to an embodiment of the invention.

FIG. 3 and FIG. 4 are timing diagrams respectively illustrating signals of a power supply system according to another embodiment of the invention. Specifically, FIG. 3 and FIG. 4 show the operations of the external signal S1, the start signal S2, the DC output voltage DC_OUT, the input port 160, the restart circuit 150, and the counter 142. The operations of components in FIG. 1 will be described below with reference to FIG. 3 and FIG. 4.

With reference to FIG. 1, the input port 160 receives the AC input voltage AC_IN through an AC input terminal. The restart circuit 150 is coupled to the input port 160, the AC to DC adapter 140, and the counter 142 of the power conversion control unit 142 and configured to detect an insertion action that occurs on the input port 160; in addition, the restart circuit 150 inputs the AC input voltage AC_IN to the AC to DC adapter 130. In another embodiment of the invention, the AC to DC adapter 130 may not be coupled to the restart circuit 150; instead, the AC to DC adapter 130 is directly coupled to the input port 160 to receive the AC input voltage AC_IN.

With reference to FIG. 1 and FIG. 3, for instance, if the electronic apparatus 120 is not equipped with the battery 124 or is not connected to the power conversion apparatus 110, the restart circuit 150 at the timing t3 (shown in FIG. 3) detects that the AC input terminal of the input port 160 is pulled out from a power outlet. At the timing t4 (shown in FIG. 3), the restart circuit 150 detects that the AC input terminal of the input port 160 is again plugged into the power outlet, and the input AC input voltage AC_IN is transmitted to the AC to DC adapter 130 through the restart circuit 150, such that the AC to DC adapter 130 starts to provide the DC output voltage DC_OUT to turn on the power conversion apparatus 110. The restart circuit 150 may also at the timing t4 start the power conversion control unit 140 in the off mode according to the trigger signal S3 after detecting that the AC input terminal of the input port 160 is plugged in, such that the counter 142 starts to count at the timing t4. After a predetermined period td (e.g., 20 seconds), at the timing t5 shown in FIG. 3, the logic circuit 144 may, by means of the counter 142, learn that the power conversion apparatus 110 has been turned on for the predetermined period td, and if the external signal S1 (actually in a low level) is not enabled yet, it indicates that the electronic apparatus 120 stays turned off or is not connected. At this time, the logic circuit 144 may stop enabling the start signal S2 (actually in a high level), so as to control the AC to DC convertor to stop supplying the DC output voltage DC_OUT and turn off the power conversion apparatus 110.

By contrast, with reference to FIG. 1 and FIG. 4, after the power conversion apparatus 110 is turned on, if the electronic apparatus 120 is turned on at the timing t6 within the predetermined period td (from the timing t4 to the timing t5), the controller 122 enables the external signal S1 (actually in a high level), and the logic circuit 144 may, based on the voltage level of the external signal S1, learn that the electronic apparatus 120 is turned on. Thereby, at the timing t5, even though the counter 142 has counted for the predetermined period td, the logic circuit 144 continues enabling the start signal S2 (actually at a low level), such that the AC to DC adapter 130 continues providing the DC output voltage DC_OUT.

Figure 5:
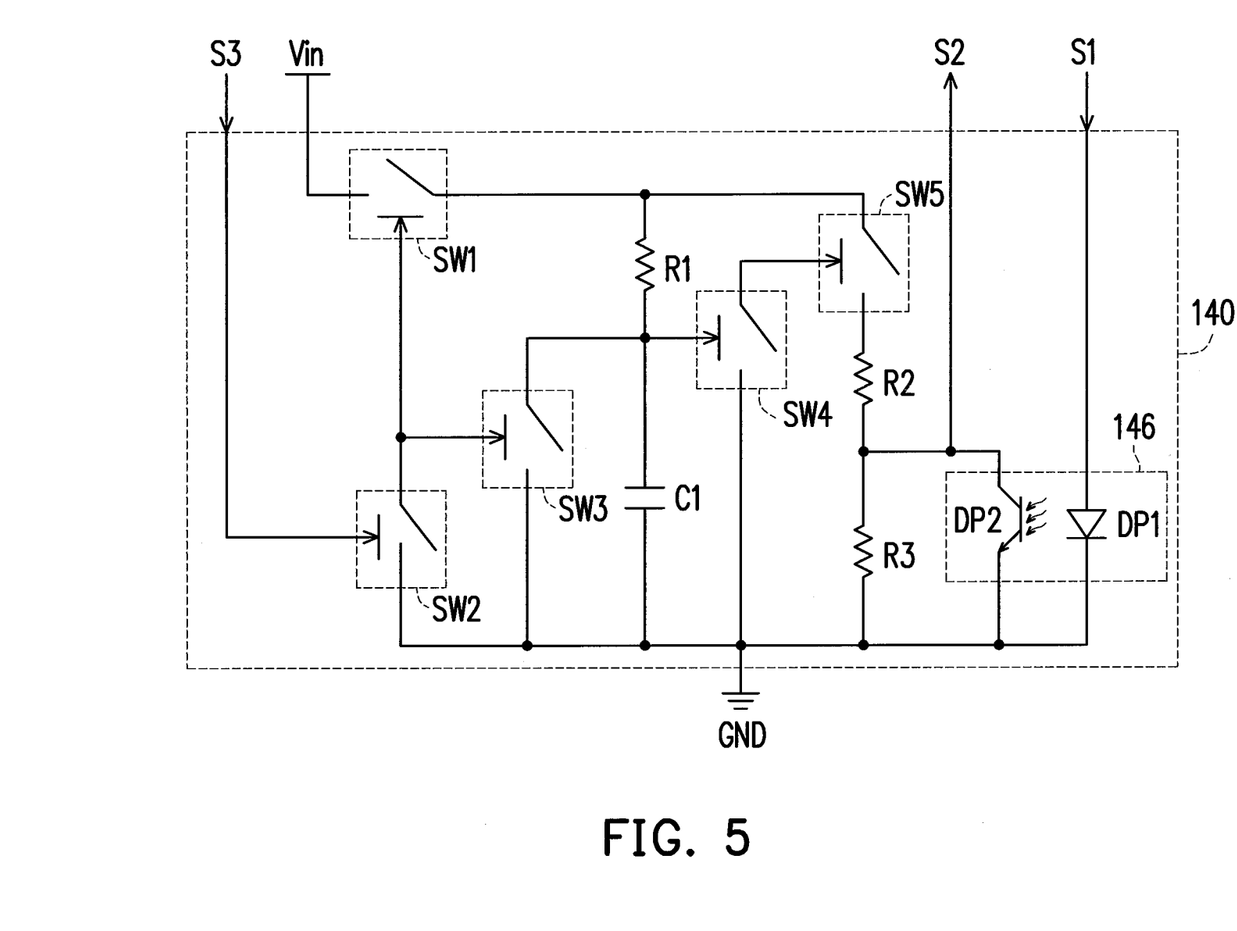
FIG. 5 is a schematic diagram illustrating a power conversion control unit according to an embodiment of the invention.

FIG. 5 is a schematic diagram illustrating a power conversion control unit 140 according to an embodiment of the invention. With reference to FIG. 1 and FIG. 5, the power conversion control unit 140 includes switches SW1 to SW5, resistors R1 to R3, a capacitor C1, and the light coupling circuit 146. The switches SW1 to SW5, the resistors R1 to R3, and the capacitor C1 may constitute the counter 142 and the logic circuit 144 shown in FIG. 1. The light coupling circuit 146 includes a light emitting diode (LED) DP1 and a photo diode DP2. When the LED DP1 receives the high-level voltage and generates the light, the photo diode DP2 may receive the light and then generate the current. With reference to FIG. 5, a first terminal of the switch SW1 is coupled to a driving voltage Vin. A first terminal of the switch SW2 is coupled to a control terminal of the switch SW1, a second terminal of the switch SW2 is coupled to a ground potential GND, and a control terminal of the switch SW2 is coupled to the trigger signal S3. A first terminal of the switch SW3 is coupled to the ground potential GND, and a control terminal of the switch SW3 is coupled to the first terminal of the switch SW2 and the control terminal of the switch SW1. A first terminal of the switch SW4 is coupled to the ground potential GND, and a control terminal of the switch SW4 is coupled to a second terminal of the switch SW3. A first terminal of the switch SW5 is coupled to a second terminal of the switch SW1, and a control terminal of the switch SW5 is coupled to a second terminal of the switch SW4. A first terminal of the resistor R1 is coupled to the second terminal of the switch SW1, and a second terminal of the resistor R1 is coupled to the second terminal of the switch SW3 and the control terminal of the switch SW4. A first terminal of the capacitor C1 is coupled to the second terminal of the resistor R1, and a second terminal of the capacitor C1 is coupled to the ground potential GND. A first terminal of the resistor R2 is coupled to a second terminal of the switch SW5, and a second terminal of the resistor R2 is coupled to the photo diode DP2 of the light coupling circuit 146 to generate the start signal S2. The LED DP1 of the light coupling circuit 146 is coupled to the external signal S1. A first terminal of the resistor R3 is coupled to the second terminal of the resistor R2, and a second terminal of the resistor R3 is coupled to the ground potential GND.

In the present embodiment, the switches SW1 to SW5 may be transistors or any other electronic devices capable of performing functions of the switches. Besides, if the control terminals of the switches SW1 and SW5 described in the present embodiment receive the low-level signals (e.g., the logic value is 0), the first and second terminals of these switches SW1 and SW5 are turned on; if the control terminals of the switches SW2, SW3, and SW4 receive the high-level signals (e.g., the logic value is 1), the first and second terminals of these switches SW2, SW3, and SW4 are turned on.

The operations of the power conversion control unit 140 are described hereinafter with reference to FIG. 1 and FIG. 5. For instance, in case that the electronic apparatus 120 is not equipped with the battery 124 or is not connected to the power conversion apparatus 110, and the restart circuit 150 detects an insertion/plugging action on the input port 160, the restart circuit 150 outputs the high-level trigger signal S3 to the control terminal of the switch SW2 of the power conversion control unit 140, such that the control terminal of the switch SW2 is turned on to start the power conversion control unit 140. Since the switch SW2 is turned on, the control terminal of the switch SW1 is coupled to the ground potential GND, and thus the switch SW1 is turned on. Besides, the driving voltage Vin is able to charge the capacitor C1 through the resistor R2, so as to enable the counter 142 to perform its functions. After the capacitor C1 is fully charged (e.g., after 20 seconds), the switch SW4 is turned on because of the high-level voltage at the control terminal of the switch SW4, and the switch SW5 is turned on because the control terminal of the switch SW5 is coupled to the ground potential GND. After the switch SW5 is turned on, the start signal S2 is no longer enabled due to the voltage-dividing effects of the driving voltage Vin and the resistors R2 and R3, i.e., the voltage level of the start signal S2 is high. Thereby, the AC to DC adapter 130 may stop providing the DC output voltage DC_OUT according to the start signal S2 (at the high level) that is no longer enabled, so as to turn off the power conversion apparatus 110.

By contrast, as shown in FIG. 1 and FIG. 5, in case that the electronic apparatus 120 is not equipped with the battery 124 or not connected to the power conversion apparatus 110, before the capacitor C1 is fully charged, the electronic apparatus 120 may be turned on because the electronic apparatus 120 receives the DC output voltage DC_OUT from the AC to DC adapter 130, and the enabled external signal S1 may be generated. According to the enabled external signal S1, the LED DP1 of the light coupling circuit 146 may be turned on and emit light, so as to turn on the photo diode DP2; further, the start signal S2 is allowed to be enabled (at the low level) because the start signal S2 is coupled to the ground potential GND. Besides, after the capacitor C is fully charged, the start signal S2 is coupled to the ground potential GND and stays enabled (at the low level) because the photo diode DP2 is turned on. Thereby, the AC to DC adapter 130 may, according to the enabled start signal S2 (at the low level), continue providing the DC output voltage DC_OUT, so as to continue turning on the power conversion apparatus 110.

Figure 6:
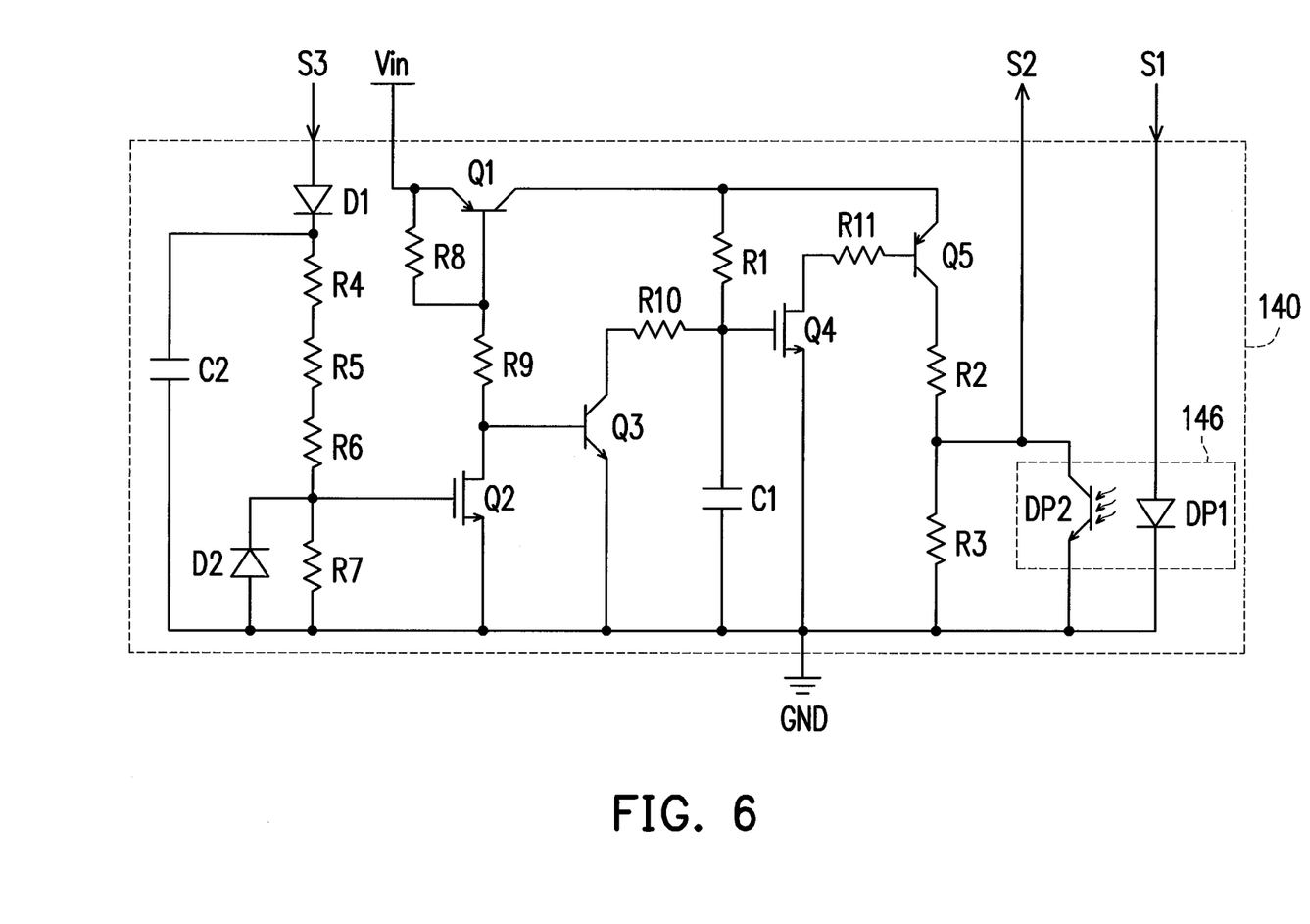
FIG. 6 is a circuit diagram of a power conversion control unit according to an embodiment of the invention.

In order to make the foregoing more comprehensible, another embodiment is provided below to detail the invention. FIG. 6 is a circuit diagram of a power conversion control unit 140 according to an embodiment of the invention. The power conversion control unit 140 includes resistors R1 to R11, capacitors C1 and C2, diodes D1 and D2, a PNP-type bipolar junction transistor (BJT) Q1, an NMOS field effect transistor Q2, a NPN-type BJT Q3, an NMOS field effect transistor Q4, a PNP-type BJT Q5, an LED DP1, and a photo diode DP2. Parts of the operational manner and some of the components have been provided in previous embodiments and thus will not be further described in this embodiment.

The difference between the present embodiment and the previous embodiments lies in that the switches in FIG. 2 are implemented in form of transistors in FIG. 6, and the following components are added in the present embodiment: an anode of the diode D1 is coupled to the trigger signal S3; a first terminal of the resistor R4 is coupled to a cathode of the diode D1; a first terminal of the resistor R5 is coupled to a second terminal of the resistor R4; a first terminal of the resistor R6 is coupled to a second terminal of the resistor R5, and a second terminal of the resistor R6 is coupled to the gate of the NMOS field effect transistor Q2; a first terminal of the resistor R7 is coupled to the gate of the NMOS field effect transistor Q2, and a second terminal of the resistor R7 is coupled to the ground potential GND; an anode of the diode D2 is coupled to the ground potential GND, and a cathode of the diode D2 is coupled to the gate of the NMOS field effect transistor Q2; a first terminal of the capacitor C2 is coupled to the cathode of the diode D1, and a second terminal of the capacitor C2 is coupled to the ground potential GND; a first terminal of the resistor R8 is coupled to the emitter of the PNP-type BJT Q1, and a second terminal of the resistor R8 is coupled to the base of the PNP-type BJT Q1; a first terminal of the resistor R9 is coupled to the base of the PNP-type BJT Q1, and a second terminal of the resistor R9 is coupled to the base of the NPN-type BJT Q3; a first terminal of the resistor R10 is coupled to the collector of the NPN-type BJT Q3, and a second terminal of the resistor R10 is coupled to the gate of the NMOS field effect transistor Q4; a first terminal of the resistor R11 is coupled to the drain of the NMOS field effect transistor Q4, and a second terminal of the resistor R11 is coupled to the base of the NPN-type BJT Q5.

As to the practical application, in the power conversion control unit 140 shown in FIG. 6, the capacitance of the capacitor C1 may be 10 µF, the capacitance of the capacitor C2 may be 10 nF, the resistance of the resistor R1 may be 10MΩ, the resistance of the resistor R2 may be 200KΩ, the resistance of the resistor R3 may be 300KΩ, the resistances of the resistors R4 to R6 may be 3.3MΩ, respectively, the resistance of the resistor R7 may be 330 kΩ, the resistances of the resistors R8 and R9 may be 200 kΩ, respectively, the resistance of the resistor R10 may be 10MΩ, and the resistance of the resistor R11 may be 200 kΩ. Certainly, in the power conversion control unit 140 shown in FIG. 3, the capacitances of the capacitors C1 and C2 and the resistances of the resistors R1 to R11 may be adjusted in response to actual design and application requirements.

To sum up, according to the power control method of the power supply system, the power conversion apparatus, and the electronic apparatus described herein, an external signal is transmitted between the power conversion apparatus and the electronic apparatus, and the external signal serves to indicate the state of the electronic apparatus. According to the external signal, the power conversion control unit of the power conversion apparatus is able to determine the state of the electronic apparatus; in addition, the power conversion apparatus may be dynamically turned on or turned off to comply with its requirement for power consumption. Thereby, unnecessary power consumption may be prevented, and the use of power may be economized.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A power conversion apparatus for an electronic apparatus, the electronic apparatus comprising a controller configured for outputting an external signal corresponding to a state of the electronic apparatus to the power conversion apparatus, the power conversion apparatus comprising:
   an AC to DC adapter coupled to the electronic apparatus for converting an AC input voltage into a DC output voltage according to the external signal outputted from the controller of the electronic apparatus and providing the DC output voltage to the electronic apparatus;
   an input port receiving the AC input voltage through an AC input terminal;
   a power conversion control unit coupled to the AC to DC adapter, wherein the power conversion control unit determines the state of the electronic apparatus according to the external signal outputted from the controller of the electronic apparatus, and if the power conversion apparatus does not output the DC output voltage to the electronic apparatus known by the external signal, the power conversion control unit turns the power conversion control unit of the power conversion apparatus into an off mode; and
   a restart circuit coupled to the input port and the power conversion control unit, wherein if the restart circuit detects an insertion action occurs on the input port, the restart circuit transmits a trigger signal to turn on the power conversion control unit from the off mode.

2. The power conversion apparatus as recited in claim 1, wherein when the electronic apparatus is turned on, the power conversion control unit turns on the power conversion apparatus according to the external signal.

3. The power conversion apparatus as recited in claim 1, wherein conditions that the power conversion apparatus does not output the DC output voltage to the electronic apparatus comprise a condition that the electronic apparatus is turned off or a condition that the power conversion control unit does not receive the external signal.

4. The conversion apparatus as recited in claim 1, wherein the power conversion control unit comprises:
   a logic circuit outputting a start signal to the AC to DC adapter according to the external signal; and
   a counter coupled to the restart circuit and the logic circuit and configured to count while the power conversion control unit starts up, the AC to DC convertor supplying the DC output voltage to a power output terminal of the power conversion apparatus within a predetermined period,
   wherein after the predetermined period if the electronic apparatus stays turned off or the power conversion control unit does not receive the external signal, the power conversion control unit controls the AC to DC convertor to stop supplying the DC output voltage and turn off the power conversion apparatus.

5. The conversion apparatus as recited in claim 4, wherein the power conversion control unit further comprises:
   a light coupling circuit coupled to the logic circuit and configured for receiving the external signal and transmitting the external signal to the logic circuit to detect the state of the electronic apparatus.

6. The conversion apparatus as recited in claim 5, wherein the power conversion control unit comprises:
   a first switch, a first terminal of the first switch being coupled to a driving voltage;

a second switch, a first terminal of the second switch being coupled to a control terminal of the first switch, a second terminal of the second switch being coupled to a ground potential, a control terminal of the second switch being coupled to the restart circuit;

a third switch, a first terminal of the third switch being coupled to the ground potential, a control terminal of the third switch being coupled to the first terminal of the second switch and the control terminal of the first switch;

a fourth switch, a first terminal of the fourth switch being coupled to the ground potential, a control terminal of the fourth switch being coupled to a second terminal of the third switch;

a fifth switch, a first terminal of the fifth switch being coupled to a second terminal of the first switch, a control terminal of the fifth switch being coupled to a second terminal of the fourth switch;

a first resistor, a first terminal of the first resistor being coupled to the second terminal of the first switch, a second terminal of the first resistor being coupled to the second terminal of the third switch and the control terminal of the fourth switch;

a first capacitor, a first terminal of the first capacitor being coupled to the second terminal of the first resistor, a second terminal of the first capacitor being coupled to the ground potential;

a second resistor, a first terminal of the second resistor being coupled to a second terminal of the fifth switch, a second terminal of the second resistor being coupled to the AC to DC adapter and the light coupling circuit to generate the start signal; and a third resistor, a first terminal of the third resistor being coupled to the second terminal of the second resistor, a second terminal of the third resistor being coupled to the ground potential.

7. The conversion apparatus as recited in claim 6, wherein the power conversion control unit further comprises:

a first diode, an anode of the first diode being coupled to the restart circuit;

a fourth resistor, a first terminal of the fourth resistor being coupled to a cathode of the first diode;

a fifth resistor, a first terminal of the fifth resistor being coupled to a second terminal of the fourth resistor;

a sixth resistor, a first terminal of the sixth resistor being coupled to a second terminal of the fifth resistor, a second terminal of the sixth resistor being coupled to the control terminal of the second switch;

a seventh resistor, a first terminal of the seventh resistor being coupled to the control terminal of the second switch, a second terminal of the seventh resistor being coupled to the ground potential;

a second diode, an anode of the second diode being coupled to the ground potential, a cathode of the second diode being coupled to the control terminal of the second switch;

a second capacitor, a first terminal of the second capacitor being coupled to the cathode of the first diode, a second terminal of the second capacitor being coupled to the ground potential;

an eighth resistor, a first terminal of the eighth resistor being coupled to the first terminal of the first switch, a second terminal of the eighth resistor being coupled to the control terminal of the first switch;

a ninth resistor, a first terminal of the ninth resistor being coupled to the control terminal of the first switch, a second terminal of the ninth resistor being coupled to the control terminal of the third switch;

a tenth resistor, a first terminal of the tenth resistor being coupled to the second terminal of the third switch, a second terminal of the tenth resistor being coupled to the control terminal of the fourth switch; and an eleventh resistor, a first terminal of the eleventh resistor being coupled to the second terminal of the fourth switch, a second terminal of the eleventh resistor being coupled to the control terminal of the fifth switch.

* * * * *